United States Patent
Kauko

(10) Patent No.: US 9,223,446 B2
(45) Date of Patent: Dec. 29, 2015

(54) TOUCH-SENSITIVE SURFACE

(75) Inventor: Jarmo Kauko, Tampere (FI)

(73) Assignee: Nokia Technologies Oy, Espoo (FI)

(*) Notice: Subject to any disclaimer, the term of this patent is extended or adjusted under 35 U.S.C. 154(b) by 326 days.

(21) Appl. No.: 13/036,175

(22) Filed: Feb. 28, 2011

(65) Prior Publication Data

US 2012/0218218 A1 Aug. 30, 2012

(51) Int. Cl.
- *G06F 3/045* (2006.01)
- *G06F 3/044* (2006.01)
- *G06F 3/041* (2006.01)

(52) U.S. Cl.
CPC .............. *G06F 3/044* (2013.01); *G06F 3/0416* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 6,360,004 B1* | 3/2002 | Akizuki | 382/124 |
| 6,498,590 B1 | 12/2002 | Dietz et al. | |
| 6,898,299 B1* | 5/2005 | Brooks | 382/115 |
| 6,909,373 B2* | 6/2005 | Power et al. | 340/665 |
| 7,441,202 B2* | 10/2008 | Shen et al. | 715/769 |
| 7,453,444 B2* | 11/2008 | Geaghan | 345/173 |
| 7,832,694 B2* | 11/2010 | German et al. | 248/125.8 |
| 7,969,423 B2* | 6/2011 | Kawabe | 345/173 |
| 7,976,372 B2* | 7/2011 | Baerlocher et al. | 463/12 |
| 8,087,983 B2* | 1/2012 | Longway | 463/7 |
| 8,117,922 B2* | 2/2012 | Xia et al. | 73/862.041 |
| 8,159,472 B2* | 4/2012 | Geaghan | 345/174 |
| 8,231,458 B2* | 7/2012 | Baerlocher et al. | 463/25 |
| 8,235,812 B2* | 8/2012 | Baerlocher et al. | 463/30 |
| 8,564,555 B2* | 10/2013 | Day et al. | 345/173 |
| 2003/0048260 A1* | 3/2003 | Matusis | 345/173 |
| 2004/0136573 A1 | 7/2004 | Sato | |
| 2006/0028453 A1* | 2/2006 | Kawabe | 345/173 |
| 2007/0236460 A1 | 10/2007 | Young et al. | |
| 2008/0186282 A1* | 8/2008 | Nix et al. | 345/173 |
| 2009/0295743 A1 | 12/2009 | Nakajoh | |
| 2010/0177121 A1 | 7/2010 | Homma et al. | |
| 2010/0259503 A1* | 10/2010 | Yanase et al. | 345/174 |

(Continued)

FOREIGN PATENT DOCUMENTS

| | | |
|---|---|---|
| EP | 1391807 | 2/2004 |
| EP | 1903509 | 3/2008 |
| EP | 2175344 | 4/2010 |

(Continued)

OTHER PUBLICATIONS

International Search Report for International Application No. PCT/FI2012/050027—Date of Completion of Search: Jun. 8, 2012—7 pages.

(Continued)

*Primary Examiner* — Aneeta Yodichkas
*Assistant Examiner* — Karin Kiyabu
(74) *Attorney, Agent, or Firm* — Locke Lord LLP

(57) ABSTRACT

A body part of a user touching a touch sensitive surface is determined based on a measured electrostatic signal. The electrostatic signal is transmitted by a transmitter and received by a receiver using a capacitively coupled human body as a communication channel. A touch signal is provided by the touch sensitive surface being touched by the user. The received electrostatic signal is measured in response to the touch signal and the body part of the user touching the touch sensitive surface is determined.

20 Claims, 4 Drawing Sheets

(56) References Cited

U.S. PATENT DOCUMENTS

2010/0310136 A1 12/2010 Tsuda
2012/0032979 A1* 2/2012 Blow et al. .................. 345/647

FOREIGN PATENT DOCUMENTS

EP 2196891 6/2010
WO WO0120538 3/2001

OTHER PUBLICATIONS

Written Opinion of the International Searching Authority for International Application No. PCT/FI2012/050027—Date of Completion of Opinion: Jun. 8, 2012—8 pages.

* cited by examiner

TOUCH-SENSITIVE SURFACE

TECHNICAL FIELD

The present invention generally relates to touch-sensitive surfaces. The invention relates particularly, though not exclusively, to determining a body part of a user touching the touch sensitive surface using an electrostatic signal.

BACKGROUND ART

Touch-sensitive surfaces are widely used to provide a user with an enhanced pointing interface. Such surfaces may be used as touch-sensitive displays or touch-sensitive pads with normal displays, for example.

There is variety of technologies for the touch-sensitive surfaces, such as resistive, capacitive, acoustic, and infrared. The capacitive touch-sensitive surfaces are currently very popular and typically provide so-called multi-touch feature. The multi-touch feature enables a detection of two simultaneous touches. Such simultaneous touches may be used for generating two-finger gestures, such as zoom and rotate, for example.

The user operates a handheld portable apparatus in different modes. When an apparatus comprising a touch-sensitive surface, such as touch display, is operated in the landscape mode, the apparatus is often held by both hands while using thumbs to interact with the touch-sensitive surface. Using two thumbs is particularly helpful in certain tasks, for example in full qwerty text entry.

SUMMARY

According to a first example aspect of the invention there is provided an apparatus comprising:
   a transmitter configured to send an electrostatic signal;
   a receiver configured to receive the electrostatic signal using a capacitively coupled human body as a communication channel;
   a touch sensitive surface configured to provide a touch signal; wherein
   the apparatus is configured at least to:
     measure the received electrostatic signal in response to the touch signal; and
     determine a body part of a user touching the touch sensitive surface based on the measured electrostatic signal.

A circuit length for the received electrostatic signal may be determined. Based on the circuit length the body part of the user touching the touch sensitive surface may be determined. A circuit impedance may be defined based on the received electrostatic signal and the circuit length for the received electrostatic signal may be defined using the circuit impedance. In an example embodiment of the invention, the circuit impedance comprises at least a capacitance value and a resistance value of the communication channel between the transmitter and the receiver. The capacitance value of the communication channel may depend on at least first capacitance between the transmitter of the apparatus and a first body part of the user, and second capacitance between a second body part of the user and the touch sensitive surface. The circuit length for the received electrostatic signal may be defined using at least one of the following: a strength of the received electrostatic signal and a timing of the received electrostatic signal.

In an example embodiment of the invention, the apparatus further comprises a ground configured to provide a return path for the electrostatic signal, wherein the ground is at least one of the following: an air ground and an earth ground. The transmitter may comprise a conductive sheet located in an insulating cover part of the apparatus. The conductive sheet may be placed in the cover part next to the user's first palm when the user is operating the apparatus. An actuator may be used to provide a signal path for the electrostatic signal between the body part of the user touching the touch-sensitive surface and the touch sensitive surface.

In an example embodiment of the invention, the apparatus further comprises at least one processor, and at least one memory including computer program code, the at least one memory and the computer program code being configured to, with the at least one processor, cause the apparatus at least to:
   measure the received electrostatic signal in response to the touch signal; and
   determine a body part of a user touching the touch sensitive surface based on the measured electrostatic signal.

The body part of the user between a first hand and a second hand may be determined. In response to the determining of the first hand, a first function may be initiated and in response to the determining of the second hand, a second function may be initiated. The first function may initiate at least one of the following: selecting an item on the touch sensitive surface, activating a function, and opening a first context menu for the user. The second function may initiate at least opening a second context menu for the user. The second context menu may be configured to be displayed as a round-shaped rendered object on the touch sensitive surface next to a touch position of the user touching the touch sensitive surface.

According to a second example aspect of the invention there is provided a method comprising:
   transmitting an electrostatic signal;
   receiving the electrostatic signal using a capacitively coupled human body as a communication channel;
   providing a touch signal by a touch sensitive surface being touched by a user;
   measuring the received electrostatic signal in response to the touch signal; and
   determining a body part of the user touching the touch sensitive surface based on the measured electrostatic signal.

In an example embodiment of the invention, the method further comprises defining a circuit length for the received electrostatic signal, and determining the body part of the user touching the touch sensitive surface based on the defined circuit length for the received electrostatic signal. The method may further comprise defining circuit impedance based on the received electrostatic signal, and defining the circuit length for the received electrostatic signal using the circuit impedance.

According to a third example aspect of the invention there is provided a computer program embodied on a computer readable medium comprising computer executable program code which, when executed by at least one processor of an apparatus, causes the apparatus to:
   transmit an electrostatic signal;
   receive the electrostatic signal using a capacitively coupled human body as a communication channel;
   provide a touch signal by a touch sensitive surface being touched by a user;
   measure the received electrostatic signal in response to the touch signal; and
   determine a body part of the user touching the touch sensitive surface based on the measured electrostatic signal.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
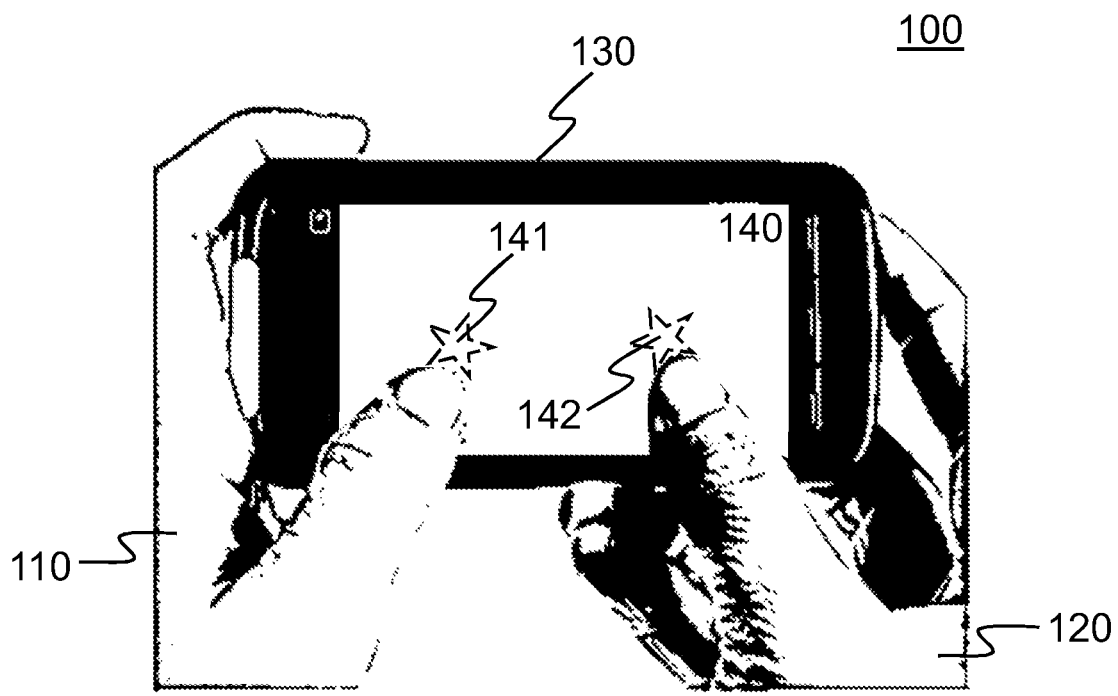
FIG. 1 shows a schematic picture of an apparatus according to an example embodiment of the invention.

FIG. 1 shows a schematic picture of an apparatus 100 according to an example embodiment of the invention. The apparatus 100 comprises a touch-sensitive surface 140, such as a touch display. Typically, when the apparatus 100 is operated in a landscape mode, the user holds the apparatus 100 with both hands 110, 120. The first hand 110 provides a grip to a cover part 130 of the apparatus 100. Typically, a first end of the cover part 130 may be placed to the palm of the first hand 110, while a second end of the cover part 130 may be placed to the palm of the second hand 120. The apparatus 100 may also be held and operated between fingers of the first hand 110 and the second hand 120.

In an example embodiment of the invention, the user operates the apparatus 100 with both hands 110, 120. For example in the landscape operating mode, the user may operate the touch-sensitive surface 140 with at least two fingers, typically thumbs. In such mode, the user may touch the touch-sensitive surface 140 at a first position 141, using the first hand 110. Similarly, the user may touch the touch-sensitive surface 140 at a second position 142, using the second hand 120. The first position 141 and the second position 142 may be touched separately or simultaneously. In an example embodiment of the invention, the apparatus 100 enables detection of a hand, and even a finger, touching the touch-sensitive surface 140. Touching the touch-sensitive surface 140 with the first hand 110 may provide a first set of user inputs, whereas touching the touch-sensitive surface 140 with the second hand 120 may provide a second set of user inputs. Thus, touching the first position 141 with the first hand 110, may provide a different user input than touching the same position with the second hand 120. Same applies to touching of the second position 142 with the first and second hands 110, 120.

Figure 2:
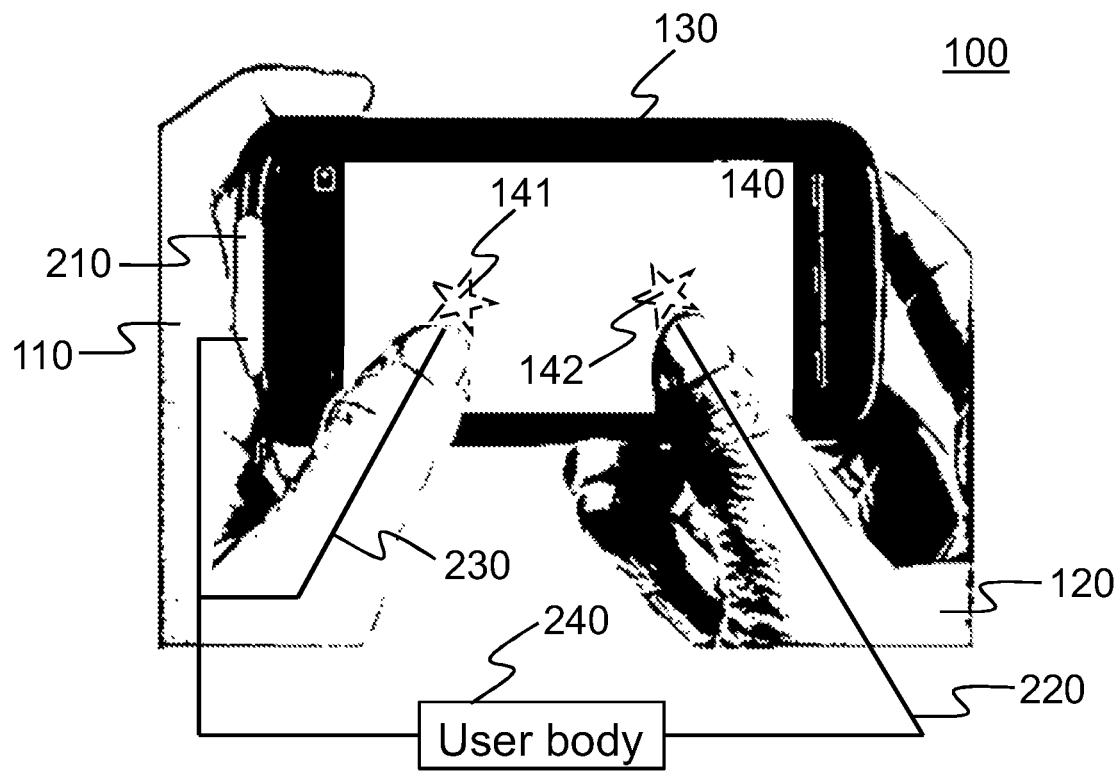
FIG. 2 shows a schematic picture of an apparatus and a user body according to an example embodiment of the invention.

FIG. 2 shows a schematic picture of an apparatus 100 and a user body 240 according to an example embodiment of the invention. The touch-sensitive surface 140 comprises a capacitive touch screen interface that differentiates between the left hand 110 and the right hand 120 by transmitting a signal through the user's hand and body. Thumbs of the left hand 110 and the right hand 120 may be used for different functions. For example, the right hand 120 (dominant hand) thumb may be used as a left mouse click to make selections. The left hand 110 (non-dominant hand) thumb may be used for secondary tasks, such as opening a context menu.

In an example embodiment of the invention, the cover part 130 of the apparatus 100 comprises an insulating material. A first end of the apparatus cover part 130 comprises a conductive sheet 210 under the cover. With a typical two-handed grip, the conductive sheet 210 is located under the user's left hand 110 palm. The conductive sheet 210 may function as a transmitter antenna and may be connected to a transmitter (not shown). The transmitter may be connected to a receiver (not shown) that may be located under the touch-sensitive surface 140.

When the user touches the touch-sensitive surface 140, the transmitter may send an electrostatic signal using the conductive sheet antenna 210. When using the left hand 110 thumb, a first electrical circuit 230 may be completed through the user's left hand 110. The first electrical circuit 230 is routed from the conductive sheet 210 of the transmitter to left hand 110 palm, through the left hand 110 palm to the left thumb, and from the left hand 110 thumb to the touch-sensitive surface 140 and the receiver underneath of the first position 141. When using the right hand 120 thumb, a second electrical circuit 220 may be completed through the user's body 240. The second electrical circuit 220 is routed from the conductive sheet 210 of the transmitter to left hand 110 palm, from the left hand 110 palm to the left hand 110, from the left hand 110 through the user's body 240 to the right hand 120, and from the right hand 120 thumb to the touch-sensitive surface 140 and the receiver underneath of the second position 142. The receiver may recognize the circuit length from a signal strength and a signal timing that are different for the electrostatic signal travelling through the first electrical circuit 230 and the second electrical circuit 220.

Figure 3:
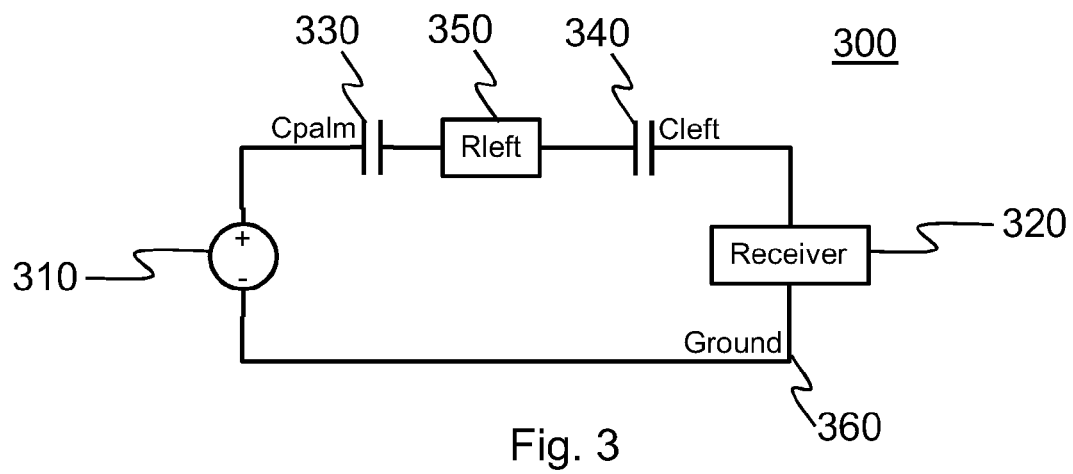
FIG. 3 shows a schematic picture of a capacitive coupling for a first hand according to an example embodiment of the invention.

FIG. 3 shows a schematic picture of a capacitive coupling for a first hand according to an example embodiment of the invention. A simplified equivalent circuit 300 comprises main components. A transmitter 310 is configured to send an electrostatic signal using, for example, the conductive sheet 210 of FIG. 2. The conductive sheet 210 may be replaced by some other conductive element or antenna. The transmitter 310 comprises an oscillator, for example, and may be capacitively coupled to a receiver 320. The receiver 320 comprises a differential amplifier, for example. Cpalm 330 represents capacitance between the conductive sheet of the apparatus and the left hand palm. Cleft 340 represents capacitance between the left hand thumb and the receiver 320 beneath the touch-sensitive surface. Total coupling capacitance is the series combination of these two capacitances and may be represented as: Ctotal1=(Cpalm*Cleft)/(Cpalm+Cleft). The transmitter 310 is capacitively coupled to the receiver 320 through the user body. Rleft 350 represents resistance of a signal path through the user body for the first hand. Such resistance 350 comprises the resistance between the left palm of the user and the left thumb, in this example. The return path 360 is provided by a reference ground level, for example an air ground or an earth ground. The earth ground may refer to conductors and dielectrics in the environment that are in close proximity to the apparatus or in the apparatus. Impedances comprising capacitances are represented as purely reactive, though they may contain a real component of resistance.

Figure 4:
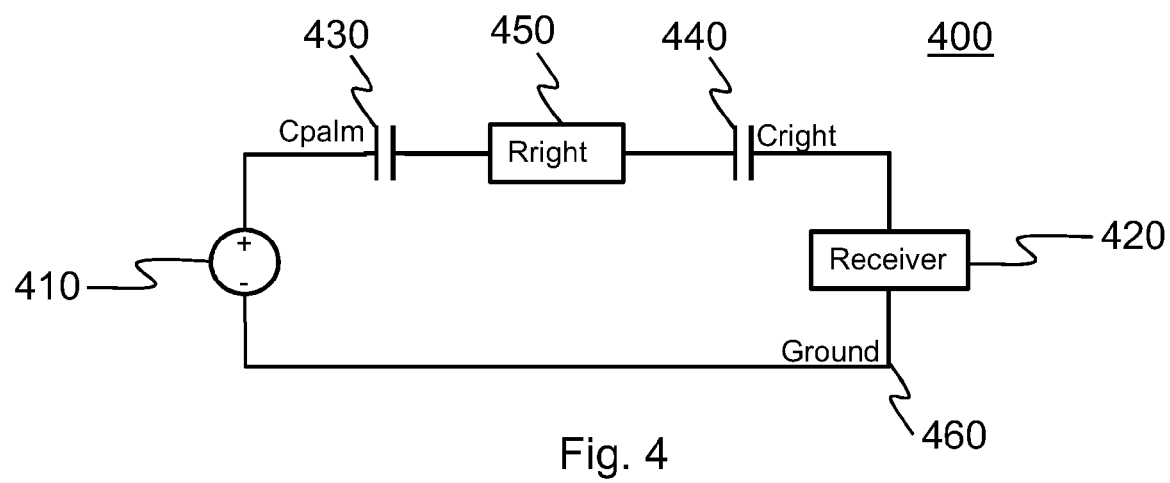
FIG. 4 shows a schematic picture of a capacitive coupling for a second hand according to an example embodiment of the invention.

FIG. 4 shows a schematic picture of a capacitive coupling for a second hand according to an example embodiment of the invention. A simplified equivalent circuit 400 comprises main components. A transmitter 410 is configured to send an electrostatic signal using an antenna, for example the conductive sheet 210 of FIG. 2. The transmitter 410 comprises an oscillator, for example, and may be capacitively coupled to a receiver 420. The receiver 420 comprises a differential amplifier, for example. Cpalm 430 represents capacitance between the conductive sheet of the apparatus and the left hand palm. Cright 440 represents capacitance between the right hand thumb and the receiver 420 beneath the touch-sensitive surface. Total coupling capacitance is the series combination of these two capacitances and may be represented as: Ctotal2=(Cpalm*Cright)/(Cpalm+Cright). The transmitter 410 is capacitively coupled to the receiver 420 through the user body. Rright 450 represents resistance of a signal path through the user body for the second hand. Such resistance 450 comprises the resistance between the left palm of the user and the right thumb, in this example. The resistance Rright 450 is typically bigger than the resistance Rleft 350 of FIG. 3 due longer signal path through the user body. The return path 460 is provided by a reference ground level, for example an air ground or an earth ground. The earth ground may refer to conductors and dielectrics in the environment that are in close proximity to the apparatus or in the apparatus. Impedances comprising capacitances are represented as purely reactive, though they may contain a real component of resistance.

In an example embodiment of the invention, the resistive components may be calculated using the resistive characteristics for a user body and resistivity values for mammalian tissues. A human arm may be characterized as having a resistivity of 2.4 ohms per meter longitudinal and 6.75 ohms per meter transverse. Lung tissue may range from 1.6 to 51 ohms per meter calculated under interstitial and intra-cellular conditions, receptively. Blood is reported to have a resistivity of 1.5 ohms per meter and the resistivity of fat is 12.75 ohms per meter. The highest resistivity is for wet bovine bone, reported at 166 ohms per meter. Although the reported resistivity value for any tissue might vary by several factors, the bulk resistivity of the human body may be said to be on the order of ten ohms per meter or less. An arm is less than 7 ohms per meter and blood, which pervades the body, has a resistivity of 1.5 ohm per meter. Such resistivity information may be used for the resistance calculation for the user body resistances Rleft and Rright in FIGS. 3 and 4, respectively.

In an example embodiment of the invention, an actuator, such as a stylus, may be used for touching the touch-sensitive surface. Cright 440 represents, in such embodiment, capacitance between the right hand and the receiver 420 beneath the touch-sensitive surface. The capacitance Cright 440 comprises the capacitance between the right hand and the actuator, combined to the capacitance between the actuator and the receiver 420. Total coupling capacitance is the series combination of the capacitances Cpalm 430 and Cright 440. The total coupling capacitance may be represented as: Ctotal2=(Cpalm*Cright)/(Cpalm+Cright). The transmitter 410 is capacitively coupled to the receiver 420 through the user body and the actuator. Rright 450 represents resistance of a signal path through the user body and the actuator for the second hand. Such resistance 450 comprises the resistance between the left palm of the user and the actuator held in the right hand, in this example. The resistance Rright 450 is typically bigger than the resistance Rleft 350 of FIG. 3 due longer signal path through the user body and the actuator.

In an example embodiment of the invention, to improve electrostatic coupling, electrode areas for the transmitter and the receiver may be maximized. To maximize transmitter signal strength, the electrical impedance of the transmitter may be matched to that of a free space. Strength of transmitted waves is a function of an antenna current flow, which is inversely proportional to a reactance of the antenna. A maximum antenna current may be achieved by operating the antenna at resonance; a frequency at which the reactance goes to zero. The shortest antenna length to achieve resonance is one half of a wavelength.

Figure 5:
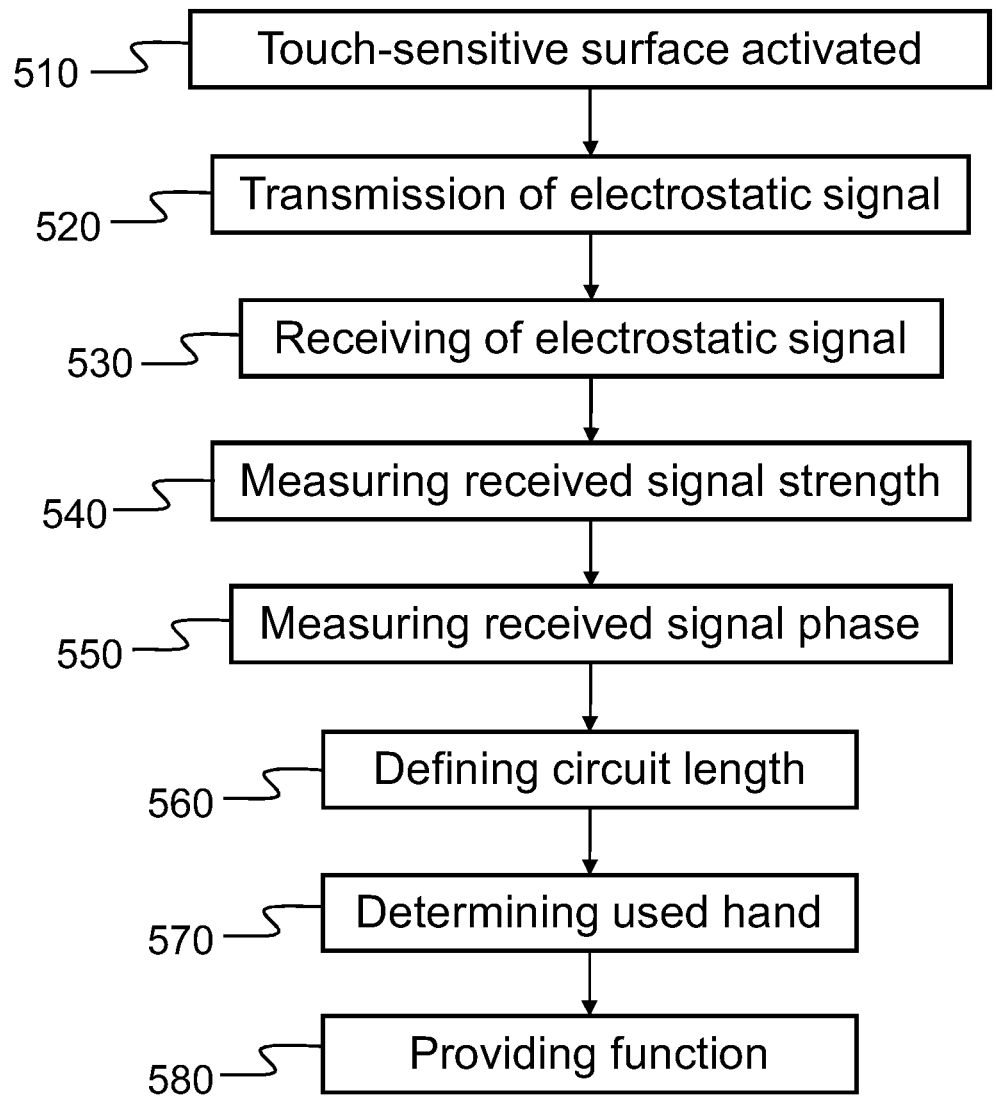
FIG. 5 shows different phases of operations in an apparatus in accordance with an example embodiment of the invention.

FIG. 5 shows different phases of operations in an apparatus in accordance with an example embodiment of the invention. First, a touch-sensitive surface is activated 510 by a user. The touch-sensitive surface may be a touch display, a touch screen or a touchpad, for example. The user may touch the surface using a left or a right hand with any finger, for example a thumb. At the same time with the activation 510, an electrostatic signal may be transmitted 520. The electrostatic signal may also be transmitted before the user touching 510 the touch-sensitive surface. However, the electrostatic signal may be available for receiving 530 after the activation 510 of the touch-sensitive surface. Transmitted electrostatic signal may travel through the user's body to the receiver. A conductive sheet or an antenna of the transmitter may be placed to a first end of the apparatus cover part, for example to the left end of the apparatus cover. The conductive sheet or the antenna is configured to transmit the electrostatic signal to the user body via the user's first hand, for example via a palm of the left hand. When the user touches the touch-sensitive surface, the electrostatic signal may be coupled to the receiver beneath the touch-sensitive surface.

In an example embodiment of the invention, the received electrostatic signal 530 may be measured. Depending on the used hand and finger for touching the touch-sensitive surface, the received signal may vary. Both capacitances and resistances of the signal path may change depending on the used hand and finger. Combined capacitances and resistances of the signal path may be called as impedance for the signal path. Reference impedances for the first hand and the second hand may be pre-defined and stored to the apparatus memory. There reference impedances may correspond to the left hand and the right hand. The received electrostatic signal strength may be measured 540 and compared to known transmitted signal strength. A first reference value for the circuit length definition 560 may be generated based on the comparison. In case the received signal strength is attenuated with an amount corresponding to the first hand reference impedance, the first reference value for the circuit length definition 560 may be set to "left", for example. In case the received signal strength is attenuated with an amount corresponding to the second hand reference impedance, the first reference value may be set to "right", for example.

Furthermore, received electrostatic signal phase may be measured 550 and compared to a known transmitted signal phase by the receiver. Comparison may be done between the received signal voltage and current, for example. Non-resistive part of the impedance is called reactance that effects to the phase-difference between the received voltage and the current. A second reference value for the circuit length definition 560 may be generated based on the comparison. In case the received signal phase difference matches to an amount corresponding to the first hand reference reactance, the second reference value for the circuit length 560 may be set to "left", for example. In case the received signal phase difference matches to an amount corresponding to the second hand reference reactance, the second reference value may be set to "right", for example.

In an example embodiment of the invention, a circuit length for the electrostatic signal may be defined 560 using at least one of the reference values. The definition of the circuit length 560 may also be omitted and a user hand may be determined 570 right after the measurements 540, 550. A first optional implementation may require that both the first reference value (signal strength) and the second reference value (signal phase difference) indicate a similar result. Such result may be chosen between "short"/"unknown"/"long" or "left"/"unknown"/"right", for example. Option of "unknown" expresses a reference value that is for some reason unknown or a value not pre-set in the system. Threshold limits may be set to improve the selection between the possible outcomes. A second optional implementation may require that one of the reference values results to "short"/"long" or "left"/"right" and the other results to "unknown". A third optional implementation may require that the user calibrates different possibilities in advance. The left and right hand may be measured and reference values for the signal strength and the signal phase difference may be stored to the apparatus memory. Even different fingers for the hand may be calibrated separately and different functionalities may be set.

In an example embodiment of the invention, a user interface of the apparatus may provide different functions 580 for different fingers. The user may benefit comparable to a two-button mouse over a single-button mouse. A left and a right thumb may be used for different actions. For example, the right thumb (dominant hand) may be used as a left mouse click for making selections. The right thumb (non-dominant hand) may be used for secondary tasks, such as opening a context menu. Naturally, the user may select the functionalities for each body part, hand or finger used. Furthermore, the system may render a user interface to minimize the finger movement and occlusion. For example, a context menu opened using left thumb may be rendered as a pie-menu towards right from the detected thumb position on the touch-sensitive surface. Such feature may ensure that the context menu is completely visible and make menu selections faster.

Figure 6:
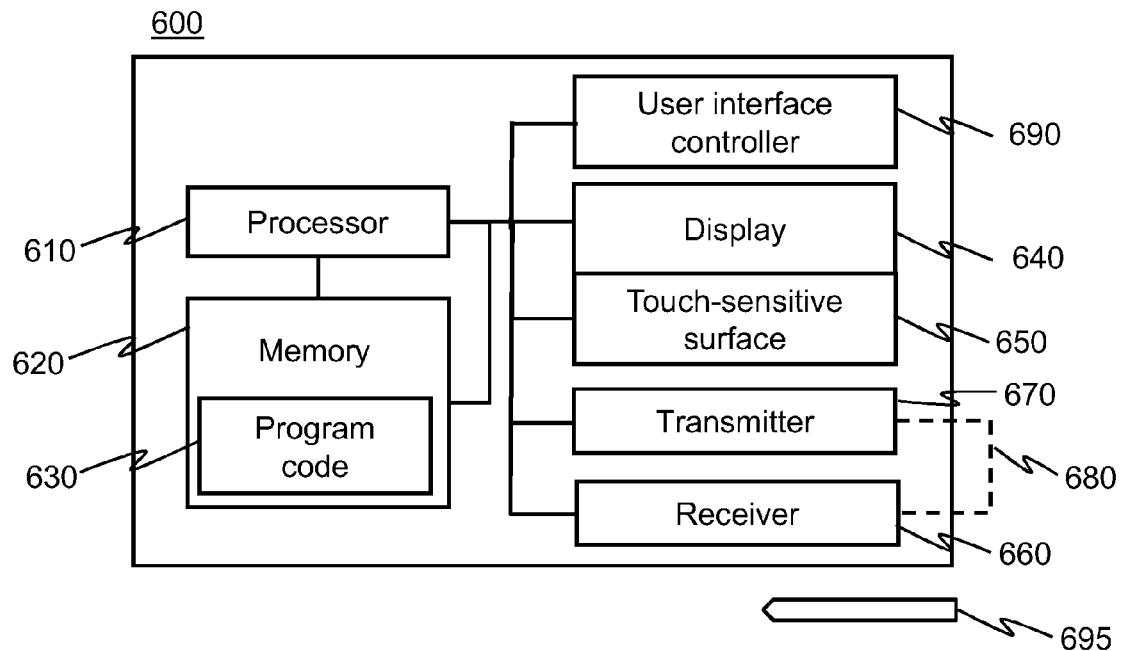
FIG. 6 presents an example block diagram of an apparatus in which various embodiments of the invention may be applied.

FIG. 6 presents an example block diagram of an apparatus 600 in which various embodiments of the invention may be applied. This may be a user equipment (UE), user device or apparatus, such as a mobile terminal or other communication device.

The general structure of the apparatus 600 comprises a display 640, a touch-sensitive surface 650, a receiver 660, a transmitter 670, a processor 610, and a memory 620 coupled to the processor 610. The apparatus 600 further comprises software 630 stored in the memory 620 and operable to be loaded into and executed in the processor 610. The software 630 may comprise one or more software modules and can be in the form of a computer program product. The apparatus 600 may further comprise a user interface controller 690 coupled to the processor 610 and a communication interface module (not shown). Furthermore, an actuator 695, for example a stylus, may be used to connect a signal path 680 between the transmitter 670 and the receiver 660.

The processor 610 may be, e.g., a central processing unit (CPU), a microprocessor, a digital signal processor (DSP), a graphics processing unit, or the like. FIG. 6 shows one processor 610, but the apparatus 600 may comprise a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The display 640 may be for example a liquid crystal display (LCD) or a light-emitting diode (LED) based display. The touch-sensitive surface 650 may be integrated to the display 640 as a touch display or a touch screen. The touch-sensitive surface 650 may also be included as a separate element, for example as a touchpad. The transmitter 670 may comprise a signal generator connected to a conductive sheet or an antenna comprising an electrode. The transmitter 670 may be connected to a ground level using another electrode to generate a closed circuit. The transmitter may produce via the signal generator an electrostatic signal to the antenna. The signal may travel through the signal path 680 using a user body as a communication channel. The receiver 660 may include a detector, for example a differential amplifier, and a pair of electrodes for connecting the receiver 660 to the touch-sensitive surface 650 for capacitively coupling the receiver 660 to the user body signal path 680. Another electrode of the receiver 660 may be coupled to the same ground level as the transmitter 670. The actuator 695, such as the stylus, may be used as a part for the signal path 680. In an example embodiment of the invention, the apparatus 600 may be held in a first hand of the user and the actuator 695 may be held in a second hand of the user. The signal may travel from the transmitter 670 through the first hand and user's body to the second hand and the actuator 695. Through the actuator 695 the signal may travel to the receiver 660.

The user interface controller 690 may comprise circuitry for receiving input from a user of the apparatus 600, e.g., via a keyboard, graphical user interface shown on the display 640 of the apparatus 600, speech recognition circuitry, or an accessory device, such as a headset, and for providing output to the user via, e.g., a graphical user interface or a loudspeaker.

A skilled person appreciates that in addition to the elements shown in FIG. 6, the apparatus 600 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 may comprise a disposable or rechargeable battery (not shown) for powering the apparatus 600 when external power if external power supply is not available.

Figure 7:
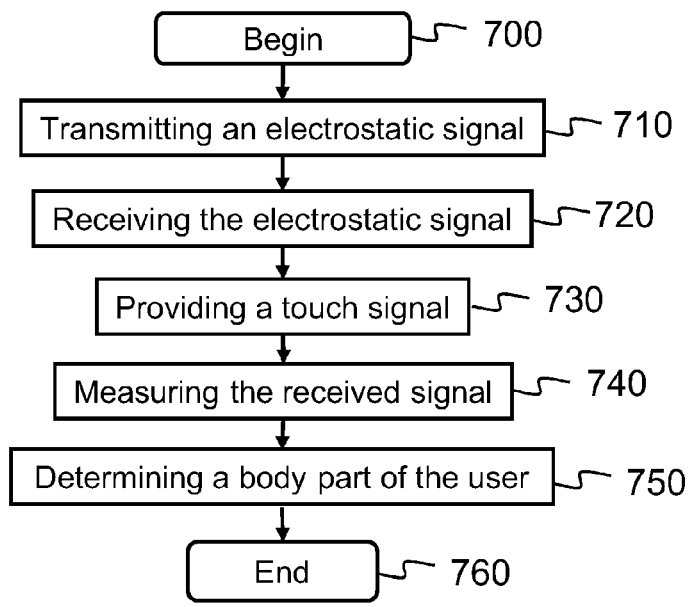
FIG. 7 shows a flow diagram showing capacitive coupling operations in an apparatus in accordance with an example embodiment of the invention.

FIG. 7 shows a flow diagram showing capacitive coupling operations in an apparatus in accordance with an example embodiment of the invention. In step 700, the method is started. In step 710, an electrostatic signal is transmitted by a transmitter. In step 720, the electrostatic signal is received using a capacitively coupled human body as a communication channel. A touch signal is provided by a touch sensitive surface in step 730. In step 740, the received electrostatic signal is measured in response to the touch signal. In step 750, a body part touching the touch sensitive surface is determined based on the measured electrostatic signal. The method ends in step 760.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
a transmitter configured to send an electrical signal;
a receiver configured to receive the electrical signal using a capacitively coupled human body as a communication channel, wherein the received electrical signal is received by the receiver from the transmitter through the capacitively coupled human body;
a touch sensitive surface configured to provide a touch signal, wherein the touch signal is a different signal than the received electrical signal;
wherein the apparatus is configured at least to:
measure the received electrical signal in response to the touch signal; and
determine a body part of a user touching the touch sensitive surface based on the measured electrical signal.

2. The apparatus of claim 1, wherein the apparatus is further configured to:
define a physical circuit length for the received electrical signal; and
determine the body part of the user touching the touch sensitive surface based on the physical circuit length for the received electrical signal.

3. The apparatus of claim 2, wherein the apparatus is further configured to:
define circuit impedance based on the received electrical signal; and
define the physical circuit length for the received electrical signal using the circuit impedance.

4. The apparatus of claim 3, wherein the circuit impedance depends on at least capacitance and resistance of the communication channel between the transmitter and the receiver.

5. The apparatus of claim 4, wherein the capacitance of the communication channel comprises at least first capacitance between the transmitter of the apparatus and a first body part of the user, and second capacitance between a second body part of the user and the touch sensitive surface.

6. The apparatus of claim 2, wherein the physical circuit length for the received electrical signal is defined using at least one of the following: a strength of the received electrical signal and a timing of the received electrical signal.

7. The apparatus of claim 1, further comprising:
a ground configured to provide a return path for the electrical signal, wherein the ground is at least one of the following: an air ground and an earth ground.

8. The apparatus of claim 1, wherein the transmitter comprises a conductive sheet located in an insulating cover part of the apparatus.

9. The apparatus of claim 8, wherein the conductive sheet is in the cover part next to the user's first palm when the user is operating the apparatus.

10. The apparatus of claim 1, wherein the apparatus is further configured to:
determine the body part of the user touching the touch sensitive surface, wherein the body part is one of a first hand and a second hand.

11. The apparatus of claim 10, wherein the apparatus is further configured to:
in response to determining that the body part is the first hand, initiate a first function; and
in response to determining that the body part is the second hand, initiate a second function.

12. The apparatus of claim 11, wherein the first function comprises at least one of the following: selecting an item on the touch sensitive surface, activating a function, and opening a first context menu for the user.

13. The apparatus of claim 11, wherein the second function comprises at least opening a second context menu for the user.

14. The apparatus of claim 13, wherein the second context menu is configured to be displayed as a round-shaped rendered object on the touch sensitive surface next to a touch position of the user touching the touch sensitive surface.

15. The apparatus of claim 1, further comprising:
an actuator configured to provide a signal path for the electrical signal between the body part of the user touching the touch-sensitive surface and the touch sensitive surface.

16. The apparatus of claim 1, further comprising:
at least one processor; and
at least one memory including computer program code, the at least one memory and the computer program code being configured to, with the at least one processor, cause the apparatus at least to:
measure the received electrical signal in response to the touch signal; and
determine a body part of a user touching the touch sensitive surface based on the measured electrical signal.

17. A method comprising:
transmitting an electrical signal;
receiving the electrical signal using a capacitively coupled human body as a communication channel, wherein the received electrical signal is received by a receiver from a transmitter through the capacitively coupled human body;
providing a touch signal by a touch sensitive surface being touched by a user, wherein the touch signal is a different signal than the received electrical signal;
measuring the received electrical signal in response to the touch signal; and
determining a body part of the user touching the touch sensitive surface based on the measured electrical signal.

18. The method of claim 17, further comprising:
defining a physical circuit length for the received electrical signal; and determining the body part of the user touching the touch sensitive surface based on the defined physical circuit length for the received electrical signal.

19. The method of claim 18, further comprising:

defining circuit impedance based on the received electrical signal; and defining the physical circuit length for the received electrical signal using the circuit impedance.

20. A computer program embodied on a non-transitory computer readable medium comprising computer executable program code which, when executed by at least one processor of an apparatus, causes the apparatus to:

transmit an electrical signal;

receive the electrical signal using a capacitively coupled human body as a communication channel, wherein the received electrical signal is received by a receiver of the apparatus from a transmitter of the apparatus through the capacitively coupled human body;

provide a touch signal by a touch sensitive surface being touched by a user, wherein the touch signal is a different signal than the received electrical signal;

measure the received electrical signal in response to the touch signal; and determine a body part of the user touching the touch sensitive surface based on the measured electrical signal.

\* \* \* \* \*